G. J. ARMSTRONG.
ELECTRIC WELDING MACHINE.
APPLICATION FILED MAY 16, 1916. RENEWED DEC. 19, 1917.
1,310,554.
Patented July 22, 1919.
3 SHEETS—SHEET 3.
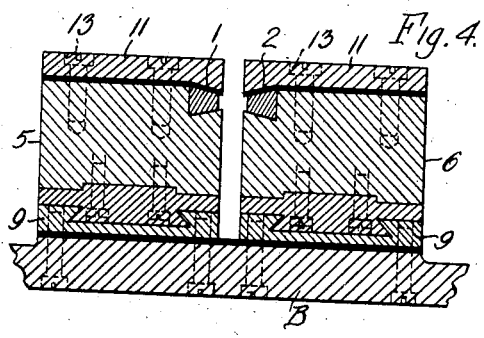
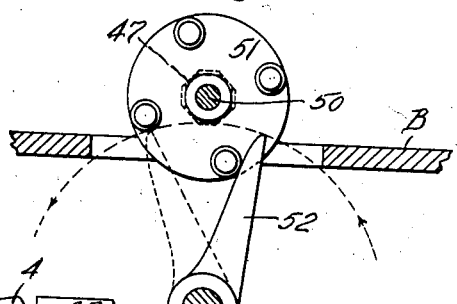
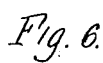
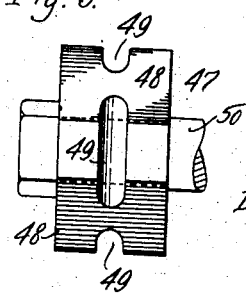
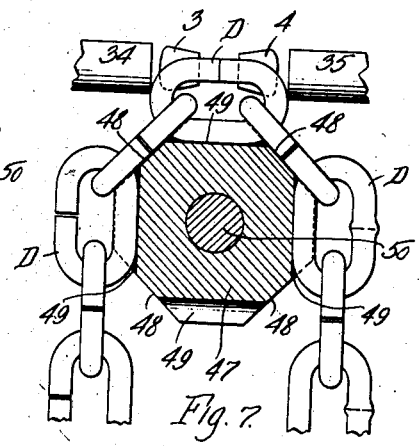
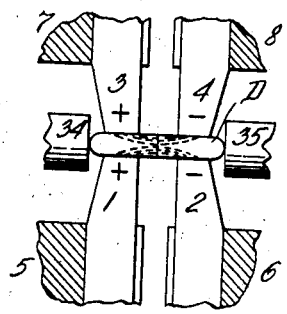
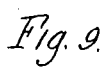
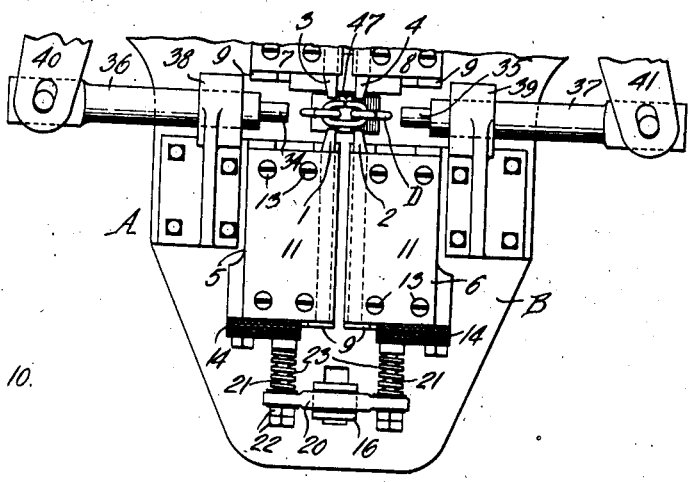
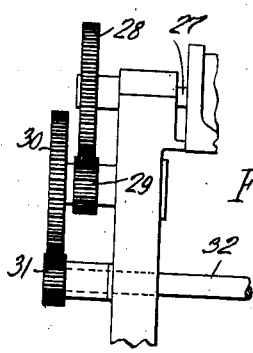
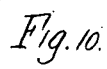
Inventor.
George J Armstrong
by Wilhelm Parker.
Attorneys.

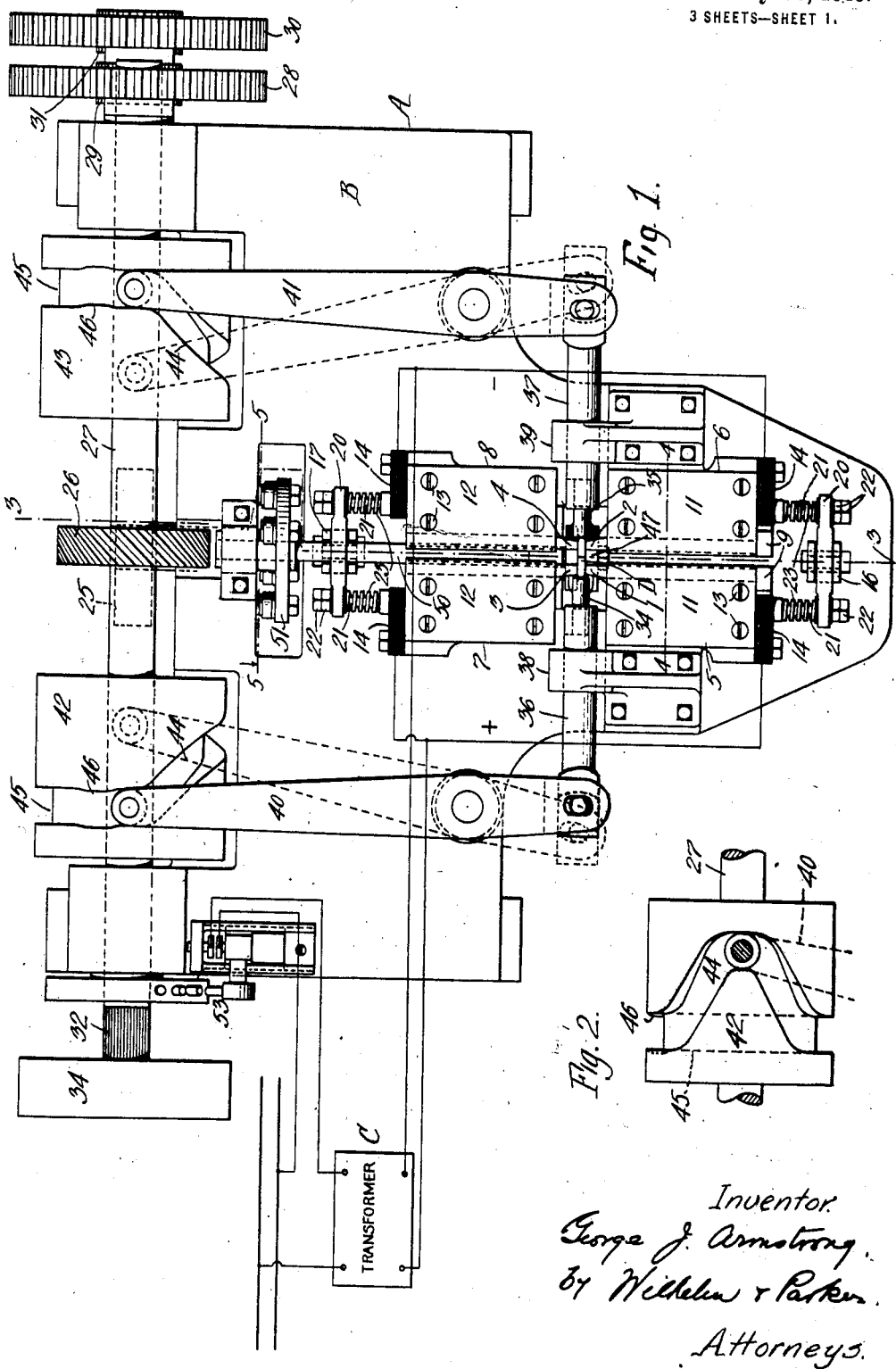

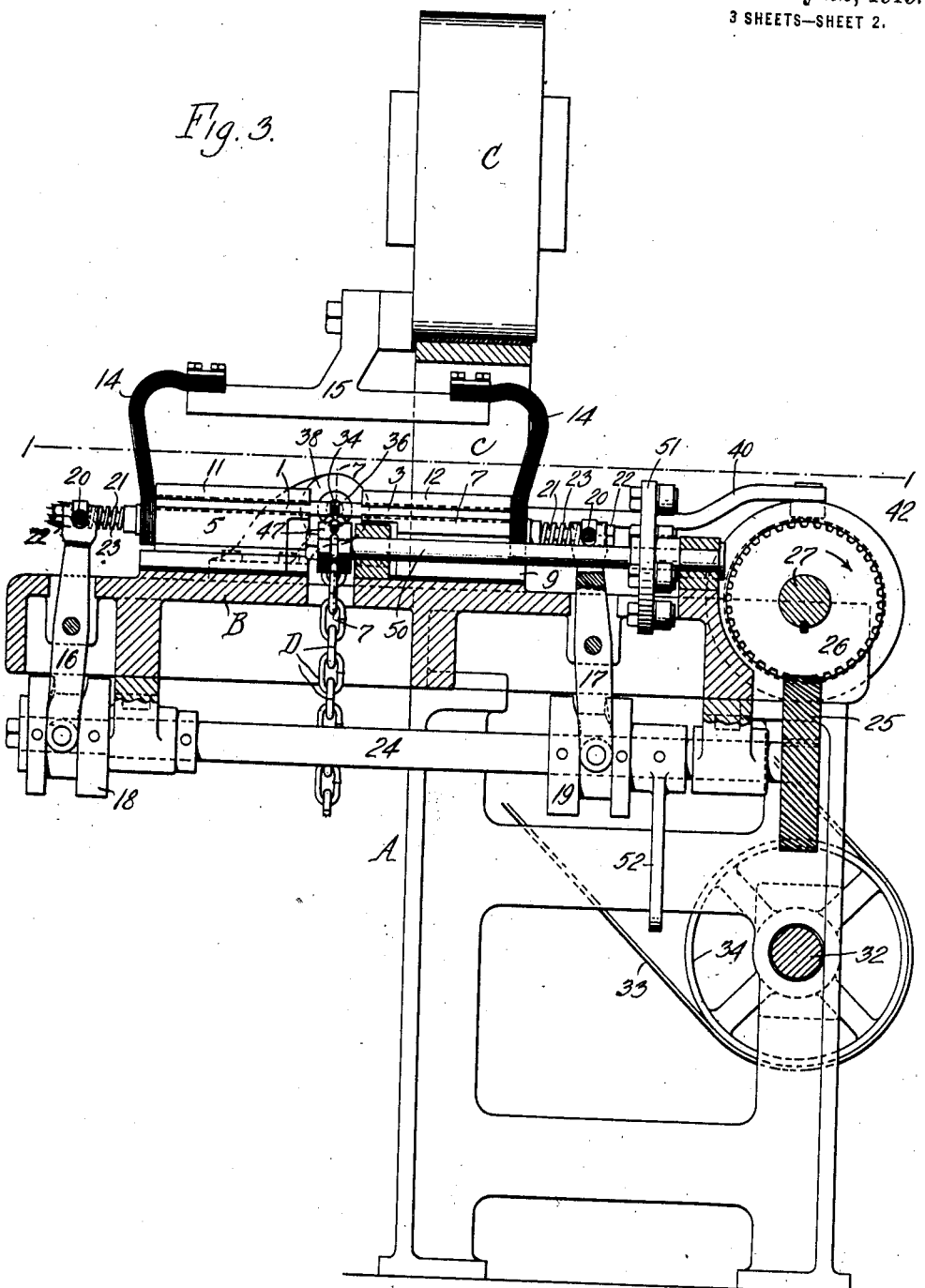

UNITED STATES PATENT OFFICE.

GEORGE J. ARMSTRONG, OF BUFFALO, NEW YORK, ASSIGNOR, BY MESNE ASSIGNMENTS, TO THE COLUMBUS McKINNON CHAIN CO., OF COLUMBUS, OHIO.

ELECTRIC WELDING-MACHINE.

1,310,554.         Specification of Letters Patent.     Patented July 22, 1919.

Application filed May 16, 1916, Serial No. 97,803.   Renewed December 19, 1917. Serial No. 207,890.

*To all whom it may concern:*

Be it known that I, GEORGE J. ARMSTRONG, a citizen of the United States, residing at Buffalo, in the county of Erie and State of New York, have invented a new and useful Improvement in Electric Welding-Machines, of which the following is a specification.

This invention relates more particularly to machines for electrically welding chains in which the links are provided with butt joints.

In the electric chain welding machines now in common use for making butt welds, two welding electrodes are employed which are arranged to engage the outer edge of the link at opposite sides of the joint, and the end faces of the links are formed so that when they are first pressed together they contact only at the inside edge of the link, thus leaving a V-shaped gap between the ends. The electric current therefore first flows through and heats these restricted contacting parts of the ends, the heated area gradually increasing and the ends of the link being pressed together until the weld extends throughout the whole area of the joint. In this way one portion of the joint is subjected to the welding heat for a longer time than other portions and is apt to be burnt so that the weld is not uniform throughout the area of the joint.

The object of this invention is to provide a rapid and efficient machine of simple and thoroughly practical construction in which welding electrodes are provided which contact with the links at both sides of the joint and on opposite sides of the link rod so that the welding current flows through the joint, the faces of which bear flat against each other, substantially simultaneously throughout the whole area thereof and produces a strong weld of uniform character throughout the whole cross section of the link rod.

Another object is to produce an electric chain welding machine of improved construction in the respects hereinafter described and set forth in the claims.

In the accompanying drawings:

Figure 1 is a plan view, partly in horizontal section on line 1—1, Fig. 3, of an electric chain welding machine embodying the invention.

Fig. 2 is an elevation of one of the operating cams for the presser jaws.

Fig. 3 is a sectional elevation of the machine on line 3—3, Fig. 1.

Fig. 4 is a sectional elevation enlarged, of the electrodes and their supporting slides on line 4—4, Fig. 1.

Fig. 5 is a sectional elevation on line 5—5, Fig. 1, of the chain feeding mechanism.

Fig. 6 is an elevation, enlarged, of the chain feeding wheel.

Fig. 7 is a sectional elevation, enlarged, on line 7—7, Fig. 3, showing the welding mechanism.

Fig. 8 is a plan view, enlarged, of the welding electrodes with a link in position between the same.

Fig. 9 is a fragmentary view similar to Fig. 1, showing the electrodes and presser jaws separated to permit feeding of the chain.

Fig. 10 is a rear elevation on a reduced scale of the drive gearing for the cam shaft.

A represents the stationary main frame of the machine which may be of any suitable construction, but which preferably has a horizontal top portion or table B, and C represents the usual electric transformer which, in the construction shown, is supported above the table on upright legs *c*.

1, 2, and 3, 4 represent four welding electrodes which are arranged in two oppositely disposed pairs adapted to move toward and from each other into and out of contact with the opposite faces of the links D to be welded, which are held in welding position between the adjacent ends of the two pairs of electrodes as indicated in Figs. 1 and 8. When the parts are in position for welding, the electrodes of one pair contact with one face of the link at opposite sides of the joint and the other pair of electrodes similarly contact with the opposite face of the link on opposite sides of the joint so that the welding current can flow through the link from the electrodes at one side of the joint to the electrodes at the opposite side of the joint. In the arrangement shown in the drawings one electrode of each pair is a positive and the other a negative electrode and the current flows through the link, as indicated by the dotted lines in Fig. 8. The welding current thus flows simultaneously through substantially the whole area of the joint and the weld is substantially uniform throughout the area thereof. The pairs of electrodes are mounted to move toward and from each other preferably on two pairs of slides or carriers 5, 6 and 7, 8, which, in the construction shown in the drawings, are arranged to slide in guide blocks 9, which are secured on and insulated from the table in any suitable manner. The electrodes can be secured on the slides or carriers by clamping plates 11 and 12 secured to the slide blocks by screws 13 and insulated therefrom, or by any other suitable securing means which enables the electrodes to be adjusted as may be necessary for proper operation. The electrodes can be electrically connected to the transformer by conductors 14 of any suitable construction adapted to permit the movement of the electrodes. Flexible conductors formed of parallel thin metal strips are shown which are secured at one end to the electrode slides and at the other end to supports which are connected to the terminals of the transformer. One of these supports is shown at 15, Fig. 3.

The mechanism employed for moving the electrodes toward and from each other into and out of contact with the link is preferably constructed as follows:

16 and 17 represent two upright levers which are suitably fulcrumed on the table B in openings therein. The lever 16 is connected at its upper end to the slides for the electrodes 1, 2 and is provided at its lower end with an anti-friction roller entering a groove in an operating cam 18, and the other lever is similarly connected at its upper end to the slides for the other pair of electrodes 3, 4 and at its lower end to an operating cam 19. The upper end of each lever is forked and straddles a cross head or bar 20, Figs. 1 and 3, provided with holes through which pass rods or stems 21 projecting outwardly from the electrode slides. Each stem is provided at the outer side of the cross head with nuts 22 adapted to be engaged by the cross head, and springs 23 surround the stems between the cross head and the electrode slides. In this way each lever moves the two slides for one pair of electrodes but the electrodes are adapted to yield independently so as to insure perfect contact of all of the electrodes with the link in case the electrodes are not of exactly uniform length or adjusted alike on their slides. The operating cams 18 and 19 for the two pairs of electrodes are secured on a horizontal shaft 24 which is suitably journaled beneath the table B and is connected at its rear end by intermeshing spiral gear wheels 25 and 26 to a horizontal shaft 27 which extends longitudinally at the rear of the machine and is suitably journaled on the frame A. The shaft 27 is connected at one end by a train of gear wheels 28, 29, 30 and 31 to a drive shaft 32 which is suitably journaled in the lower portion of the frame and can be driven by a belt 33 and a pulley 34 at one end of the shaft, or in any other suitable way.

34 and 35 represent two presser jaws arranged to move toward and from each other in a direction lengthwise of the link to be welded for engaging the link and pressing the ends of the link together while the joint is being welded. These presser jaws, in the construction shown in the drawings, are mounted at the inner ends of two oppositely disposed plungers 36 and 37 which are arranged to slide toward and from each other in guide bearings 38 and 39 on the table and are operated by horizontal levers 40 and 41 which are suitably fulcrumed on the table and are connected at their front ends to the plungers and are provided at their rear ends with anti-friction rollers which extend into the grooves of operating cams 42, 43 secured on the shaft 27. The grooves of these cams are suitably shaped to move the presser jaws so as to force the ends of the link together and hold them in contact while heating the joint, then to force the jaws slightly nearer together to compress the ends of the link when at the welding heat and then to withdraw the jaws away from the link to permit the welded link to be moved out of and the next link to be moved into welding position. As shown in Figs. 1 and 2, the groove of each cam has a substantially V-shaped portion 44 for moving the jaws toward and from each other, a straight portion 45 extending circumferentially around the cam from one end of the V-shaped portion for holding the presser plungers in their inner position while the joint is being heated, and a short offset portion 46 between the straight portion and the other end of the V-shaped portion for giving the final pressure to the joint.

The chain is advanced or fed forwardly intermittently so as to present the alternate links (that is, the links of the chain which occupy similar positions) in succession into welding position between the two pairs of electrodes, preferably by a feed wheel 47 which is arranged below the electrodes and presser jaws to turn intermittently in a vertical plane extending crosswise relative to the direction of movement of the electrodes toward and from each other. This feed wheel is of polygonal shape in cross-section having alternate peripheral faces 48 against which the alternate links of the chain are adapted to lie flat, and having between these flat faces peripheral grooves 49 adapted to receive the other links of the chain. At each intermittent movement of the wheel it brings one of the links into position between the adjacent ends of the two pairs of electrodes in the position shown in Fig. 7, while the electrodes are separated, and holds the link upright in this position while the joint is being welded. The wheel remains stationary during the welding of each joint and when the weld is completed and the electrodes and presser plungers are withdrawn or moved away from the link the wheel is turned one step so as to carry the welded link out of welding position and bring the next alternate link into position for welding. The chain hangs over the feed wheel and may pass to the feed wheel from a supply reel or device (not shown) and pass from the feed wheel to a receiving reel or device (not shown), or to another similar machine for welding the other series of alternate links, the chain being given a partial twist between the machines so as to properly present the unwelded links to the second welding mechanism. The feed wheel can be intermittently rotated by any suitable mechanism. As shown, the feed wheel is secured on a horizontal shaft 50 which is journaled in suitable bearings on the table and is provided at the rear portion thereof with a wheel 51 provided on one face thereof with anti-friction rollers adapted to be engaged to turn the wheel intermittently by a rotary arm 52 secured to the cam shaft 24. At each revolution of this shaft the arm 52 engages one roller on the wheel 51 and turns the wheel and feed shaft until the arm moves out of contact with the roller and leaves the wheel and shaft stationary in the position to which it is moved by the arm. The electrodes and presser jaws, and the feed wheel are of course operated in the proper sequence to cause the electrodes and presser jaws to engage the link when the feed wheel is stationary, and to turn the feed wheel to advance the chain during the time that the electrodes and presser jaws are separated or out of contact with the link.

The machine, as usual, is provided with suitable means, indicated at 53, for turning the welding current on and off and regulating the same during the welding period, but these means form no part of the invention and are not herein shown or described in detail.

I claim as my invention:

1. In an electric chain welding machine, the combination of oppositely disposed pairs of welding electrodes movable toward and from each other into and out of contact with opposite faces of a chain link at opposite sides of the joint to be welded, and means movable substantially at right angles to the direction of movement of the electrodes and substantially parallel with the plane of movement thereof for pressing together the ends of the link.

2. In an electric welding machine, the combination of two oppositely disposed pairs of welding electrodes movable toward and from each other into and out of contact with opposite faces of the article at opposite sides of the joint to be welded, the two electrodes of each pair being of opposite polarity to cause the currents from the two pairs of electrodes to flow through the joint in the same direction, and means movable substantially at right angles to the direction of movement of the electrodes for pressing together the ends of the article.

3. In an electric chain welding machine, the combination of means for advancing the chain, welding electrodes movable substantially perpendicularly to the direction of movement of the chain toward and from each other into and out of contact with opposite faces of the chain link at opposite sides of the joint thereof to cause welding currents to flow into said chain link at the opposite sides thereof, and means for pressing together the ends of the link.

4. In an electric chain welding machine, the combination of means for advancing the chain, welding electrodes movable substantially perpendicularly to the direction of movement of the chain toward and from each other into and out of contact with opposite faces of the chain link at opposite sides of the joint thereof for causing welding currents to flow through said joint from opposite faces of the link, and means movable in a direction substantially perpendicular to the direction of movement of the electrodes for pressing together the ends of the link.

5. In an electric chain welding machine, the combination of means for feeding the chain with the links to be welded in upright position in a vertical plane, welding electrodes which are movable from opposite sides of said vertical plane into and out of contact with opposite faces of the chain link, and a presser device movable in a direction substantially parallel with the plane of movement of the chain for pressing together the ends of the link.

6. In an electric welding machine, the combination of welding electrodes movable horizontally toward and from each other into and out of contact with the opposite faces of the article to be welded, presser jaws movable horizontally for pressing together the parts of the article, a rotary horizontal shaft, connections between the same and said electrodes for actuating the latter by the rotation of said shaft, a horizontal shaft, connections between the same and said presser jaws for actuating said jaws by the rotation of said second shaft, and drive means for said shafts.

7. In an electric welding machine, the combination of welding electrodes movable toward and from each other into and out of contact with the article to be welded, a presser device for pressing together the parts of the article, said electrodes and presser device being movable in parallel planes in directions at an angle to each other, a shaft arranged parallel with the plane of movement of said electrodes and presser device, and operating connections between said shaft and said electrodes and presser device whereby the rotation of the shaft causes the actuation of said electrodes and presser device.

8. In an electric welding machine, the combination of welding electrodes movable toward and from each other into and out of contact with the article to be welded, a presser device for pressing together the parts of the article, said electrodes and presser device being movable in parallel planes in directions at an angle to each other, a shaft arranged parallel with the direction of movement of said electrodes, actuating connections between said shaft and said electrodes, a shaft arranged parallel with the direction of movement of said presser device, actuating connections between said latter shaft and said device, and means for driving said shafts.

9. In an automatic electric chain welding machine, the combination of means for feeding the chain the link joints of which are to be electrically welded, two pairs of welding electrodes, the two electrodes of each pair being of opposite polarity to cause the currents between the electrodes of each to flow through the link joint in the same direction, means for moving the welding electrodes toward and from the path of chain feed movement to engage the electrodes of each pair with different portions of the link at opposite sides of the link joint to be welded and to remove the pairs of electrodes from the path of chain feed movement, and means for pressing together the ends of the link.

10. In an automatic electric chain welding machine, the combination of means for feeding a chain the links of which are to be electrically welded, a plurality of pairs of welding electrodes, the two electrodes of each pair being of opposite polarity to cause the currents between the electrodes of each pair to flow through the link joint in the same direction, means for moving the electrodes into and out of contact with a link of the chain to engage the electrodes of each pair at opposite sides of the link joint and remove them from such engagement, and means for pressing together the ends of the link.

Witness my hand this 11th day of May, 1916.

GEORGE J. ARMSTRONG.

Witnesses:
C. W. PARKER,
M. J. PITMAN.